US012252056B1

(12) United States Patent
Scott, IV

(10) Patent No.: US 12,252,056 B1
(45) Date of Patent: Mar. 18, 2025

(54) SYSTEM AND METHOD FOR A SELF-ACTIVATING STOP FOR PREVENTING WATERCRAFT FROM SLIDING OFF TOWING TRAILERS AND INCLUDING AN UNSECURED STATUS INDICATION WHEN THE STOP IS UNACTIVATED

(71) Applicant: Boat Load Mate, Inc., Naples, FL (US)

(72) Inventor: William E. Scott, IV, Anchor Point, AK (US)

(73) Assignee: Boat Load Mate, Inc., Naples, FL (US)

( * ) Notice: Subject to any disclaimer, the term of this patent is extended or adjusted under 35 U.S.C. 154(b) by 706 days.

(21) Appl. No.: 17/555,621

(22) Filed: Dec. 20, 2021

Related U.S. Application Data

(63) Continuation-in-part of application No. 16/865,876, filed on May 4, 2020, now Pat. No. 11,383,631, which is a continuation of application No. 16/026,365, filed on Jul. 3, 2018, now Pat. No. 10,682,943.

(60) Provisional application No. 63/130,955, filed on Dec. 28, 2020, provisional application No. 62/590,429, filed on Nov. 24, 2017.

(51) Int. Cl.
*B60P 3/10* (2006.01)

(52) U.S. Cl.
CPC ........... *B60P 3/1066* (2013.01); *B60P 3/1075* (2013.01)

(58) Field of Classification Search
CPC ......... B60P 3/10; B60P 3/1066; B60P 3/1075; B60P 7/0892
See application file for complete search history.

(56) References Cited

U.S. PATENT DOCUMENTS

| 3,056,520 A | 10/1962 | Rutigliano |
| 3,082,892 A | 3/1963 | Cox |
| 3,155,249 A | 11/1964 | Johnson |
| 3,175,710 A | 3/1965 | Kistner |
| 3,863,594 A | 2/1975 | Gawthrop |
| 3,946,460 A | 3/1976 | Johnson |
| 3,946,614 A | 3/1976 | Martin |

(Continued)

FOREIGN PATENT DOCUMENTS

CA 2055766 3/1993

*Primary Examiner* — Christopher B Wehrly
(74) *Attorney, Agent, or Firm* — Caesar Rivise, PC

(57) ABSTRACT

A system and method using a self-activating stop device at the back of a boat trailer and providing an automatic unsecured status (US) indication to a boat driver as the boat is being driven out of the water and onto the trailer. The stop device includes a housing having a retractable stop element pivotably positioned therein and having a transmitter-detector assembly that communicates with a remotely-located receiver and indicator on the boat dashboard. As the boat is driven onto the trailer, the boat pivots the stop element down into the housing, activating the transmitter to send a signal to the receiver and illuminating the indicator while the stop element is depressed in the housing. Once the boat transom passes over the stop element, the element pivots upward acting as a stop against the transom, thereby preventing the boat from sliding back off of the trailer and shutting off the transmitter and the US indication.

10 Claims, 18 Drawing Sheets

(56) References Cited

U.S. PATENT DOCUMENTS

| | | | |
|---|---|---|---|
| 4,110,867 A | 9/1978 | Gwozdz | |
| 4,448,438 A | 5/1984 | Dewalk | |
| 4,684,145 A | 8/1987 | Tingley | |
| 4,995,629 A | 2/1991 | Poppell | |
| 5,060,963 A | 10/1991 | Godbersen | |
| 5,193,835 A | 3/1993 | Sheets | |
| 5,263,733 A | 11/1993 | Kastenberger et al. | |
| 5,544,611 A * | 8/1996 | Fahringer, Sr. | B60P 3/1075 114/343 |
| 5,596,944 A | 1/1997 | Massie | |
| 6,062,160 A | 5/2000 | Delcambre | |
| 6,199,503 B1 | 3/2001 | Midgett | |
| 6,923,138 B2 | 8/2005 | Holbrook | |
| 8,256,789 B2 | 9/2012 | Bryant, II | |
| 10,682,943 B1 * | 6/2020 | Scott, IV | B60P 7/0892 |
| 2003/0200911 A1 | 10/2003 | Tatro et al. | |
| 2006/0001236 A1 * | 1/2006 | McGinty | B60P 3/1066 280/414.1 |
| 2009/0273158 A1 | 11/2009 | Brisson et al. | |
| 2009/0302572 A1 | 12/2009 | Bryant, II | |
| 2011/0133429 A1 | 6/2011 | Caudill | |
| 2016/0339836 A1 * | 11/2016 | Sibley, Jr. | B62D 53/08 |
| 2017/0182926 A1 | 6/2017 | Rice | |
| 2017/0196160 A1 * | 7/2017 | Bjerketvedt | A01B 15/02 |
| 2020/0262329 A1 | 8/2020 | Scott, IV | |
| 2024/0034219 A1 * | 2/2024 | Kuroi | B60P 3/1066 |

* cited by examiner

SYSTEM AND METHOD FOR A SELF-ACTIVATING STOP FOR PREVENTING WATERCRAFT FROM SLIDING OFF TOWING TRAILERS AND INCLUDING AN UNSECURED STATUS INDICATION WHEN THE STOP IS UNACTIVATED

CROSS-REFERENCE TO RELATED APPLICATIONS

This non-provisional application claims the benefit under 35 U.S.C. § 119 (e) of Application Ser. No. 63/130,955 filed on Dec. 28, 2020 entitled APPARATUS AND METHOD FOR A SELF-ACTIVATING STOP FOR PREVENTING WATERCRAFT FROM SLIDING OFF TOWING TRAILERS AND INCLUDING AN UNSECURED STATUS INDICATION WHEN THE STOP IS UNACTIVATED and this non-provisional application is also a continuation-in-part application and claims the benefit under 35 U.S.C. § 120 of application Ser. No. 16/865,876 filed on May 4, 2020 which in turn is a continuation application, and claims the benefit of 35 U.S.C. § 120, of application Ser. No. 16/026,365 (now U.S. Pat. No. 10,682,943) filed on Jul. 3, 2018 both of which are entitled APPARATUS AND METHOD FOR A SELF-ACTIVATING STOP FOR PREVENTING WATERCRAFT FROM SLIDING OFF TOWING TRAILERS and wherein application Ser. No. 16/026,365 claims the benefit under 35 U.S.C. § 119 (e) of Application Ser. No. 62/590,429 filed on Nov. 24, 2017 entitled QUICK CATCH FLIP STOP TRAILER MATE, and all of whose entire disclosures are incorporated by reference herein.

BACKGROUND OF THE INVENTION

The present invention relates to self-activating stops and more particularly to a self-activating stop that is installed at the end of a trailer for hauling watercraft (e.g., boats, jet skis, etc.) to prevent the watercraft from sliding off the trailer during retrieval of the watercraft from the water.

The patent literature includes a few examples of devices meant for preventing a boat from sliding back off of a trailer. See for example, U.S. Pat. No. 3,175,710 (Kistner), U.S. Patent Publication No. 2017/0182926 (Rice) and U.S. Pat. No. 10,682,943 (Scott, IV). U.S. Pat. No. 10,682,943 (Scott, IV) is owned by the same Assignee as the present application, namely, Boat Load Mate, Inc. of Naples, FL. and is incorporated by reference herein in its entirety.

While the aforementioned devices may be generally suitable for their intended purposes, there remains a need for providing the person driving the boat onto the trailer from the body of water within an indication when the boat is secured on the trailer. The subject invention addresses the needs of the prior art.

All references cited herein are incorporated herein by reference in their entireties.

BRIEF SUMMARY OF THE INVENTION

A system for providing a self-activating stop apparatus on a watercraft trailer that automatically alerts a driver of the watercraft (e.g., a boat) of the status of the watercraft being moved onto the trailer from a body of water is disclosed. The system comprises: a self-activating stop apparatus comprising: a stop element pivotally mounted in a housing, configured for mounting to the trailer (e.g., salt-water trailer or freshwater trailer), and biased into a deployed mode such that a portion of the stop element protrudes out of the housing and wherein the portion of the pivotal stop element is driven into a retracted mode whenever the watercraft is being driven over the pivotal stop element, wherein the pivotal stop element is restored into the deployed mode once one end of the watercraft has passed over the pivotal stop element, thereby acting as a stop for preventing the watercraft from sliding off the trailer; a detector and a transmitter, wherein the detector (e.g., a non-contact sensor such as a proximity sensor, Hall effect sensor, etc.) configured to detect the retracted mode of the pivotal stop element and to activate a transmitter to emit a wireless signal while the detector detects the retracted mode of the pivotal stop element; a receiver positioned on the watercraft for receiving the wireless signal; and an indicator, associated with the receiver, wherein the indicator illuminates a first indicia (e.g., a red color illumination) whenever the receiver is receiving the wireless signal, thereby alerting the driver that the watercraft is unsecured on the trailer.

A method for implementing a self-activating stop apparatus on a watercraft trailer that automatically alerts a driver of the watercraft of the status of the watercraft being moved onto the trailer from a body of water is disclosed. The method comprises: positioning a self-activating stop apparatus on the trailer (e.g., salt-water trailer, freshwater trailer) whereby a pivotal stop element is biased into a deployed mode and wherein the pivotal stop element is driven into a retracted mode whenever the watercraft is being driven over the pivotal stop element, wherein the pivotal stop element is restored into the deployed mode once one end of the watercraft has passed over the pivotal stop element, thereby acting as a stop for preventing the watercraft from sliding off the trailer; providing a detector (e.g., a non-contact sensor such as a proximity sensor, Hall effect sensor, etc.) for detecting the pivotal stop element in the retracted mode; activating a transmitter, by the detector when the retracted mode is detected, to transmit a wireless signal as long as the detector is detecting the pivotal stop element in the retracted mode; providing a receiver on the watercraft for receiving the wireless signal; associating an indicator with the receiver in the vicinity of the driver in the watercraft; and illuminating the indicator with a first indicia (e.g., a red color illumination) as long as the receiver is receiving the wireless signal, thereby indicating that pivotal stop member is in the retracted mode and the watercraft is unsecured on the trailer.

A self-activating stop apparatus that forms a portion of a warning system that automatically alerts a driver of a watercraft of the status of the watercraft as it is being moved onto a trailer from a body of water is disclosed. The apparatus comprises: a stop element pivotally mounted in a housing, configured for mounting to the trailer, and biased into a deployed mode such that a portion of the stop element protrudes out of the housing and wherein the pivotal stop element is driven into a retracted mode whenever the watercraft is being driven over the pivotal stop element, wherein the pivotal stop element is restored into the deployed mode once one end of the watercraft has passed over the pivotal stop element, thereby acting as a stop for preventing the watercraft from sliding off the trailer; and a detector (e.g., a non-contact sensor such as a proximity sensor, Hall effect sensor, etc.) and a transmitter, wherein the detector is configured to detect the retracted mode of the pivotal stop element and to activate a transmitter to emit a wireless signal while the detector detects the retracted mode of the pivotal stop element.

A method for automatically securing a watercraft on a trailer (e.g., salt-water trailer, freshwater trailer) and for providing an automatic alert to a receiver in the vicinity of a driver of the watercraft of the status of the watercraft being moved onto the trailer from a body of water is disclosed. The method comprises: positioning a housing on the trailer wherein the housing comprises a stop element pivotally mounted therein and biased in a deployed mode such that a portion of the stop element protrudes out of the housing and wherein the pivotal stop element is driven into a retracted mode whenever the watercraft is being driven over the pivotal stop element, wherein the pivotal stop element is restored into the deployed mode once one end of the watercraft has passed over the pivotal stop element, thereby acting as a stop for preventing the watercraft from sliding off the trailer; providing a detector (e.g., a non-contact sensor such as a proximity sensor, Hall effect sensor, etc.) in the housing for detecting the pivotal stop element in the retracted mode; and activating a transmitter, by the detector when the retracted mode is detected, to transmit a wireless signal to the receiver as long as the detector is detecting the pivotal stop element in the retracted mode.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1:
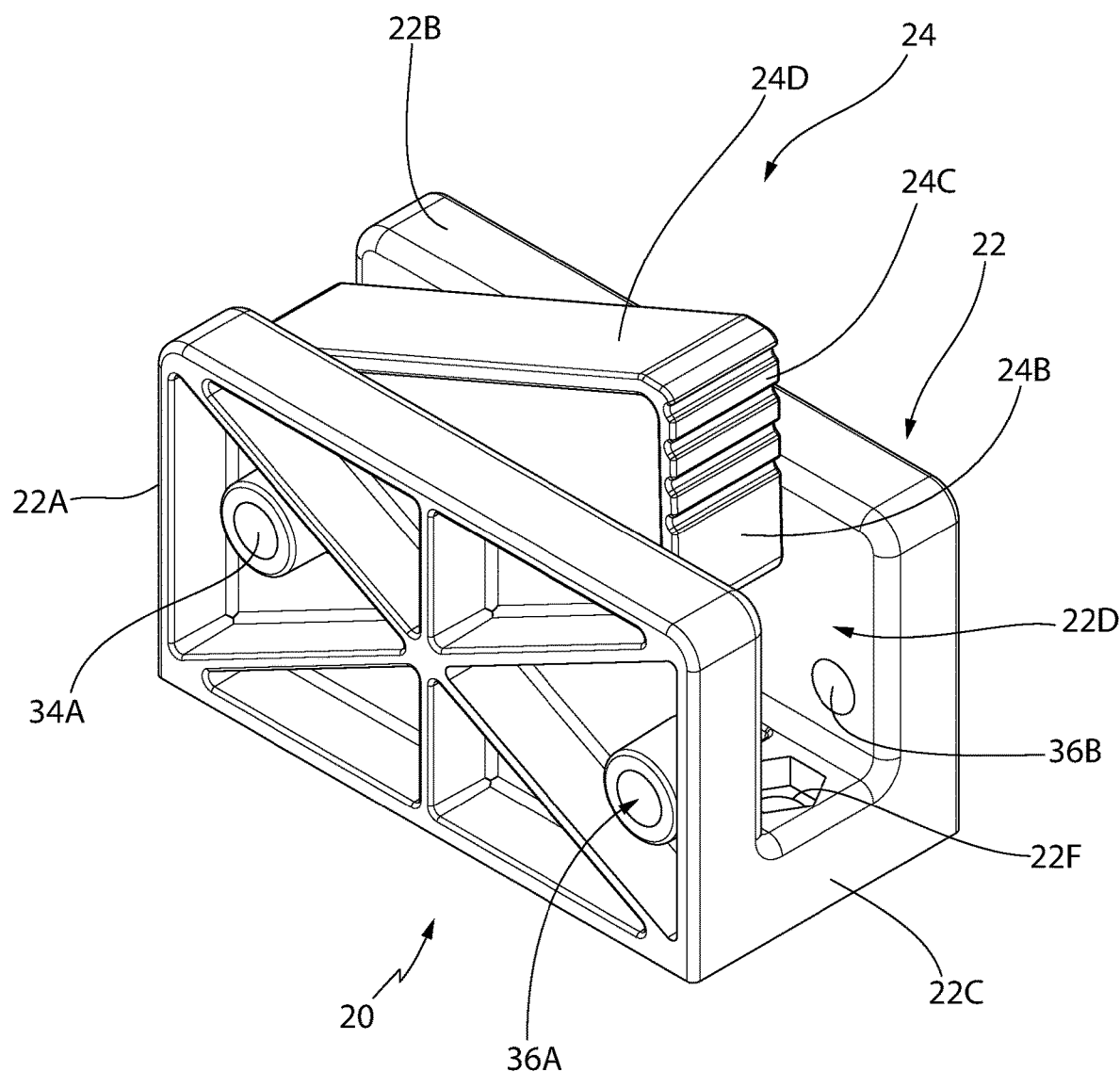
FIG. 1 is a perspective view of a self-activating stop device of U.S. Patent Publication No. 2020/0262329 (Scott, IV) shown in its deployed mode.
Figure 2:
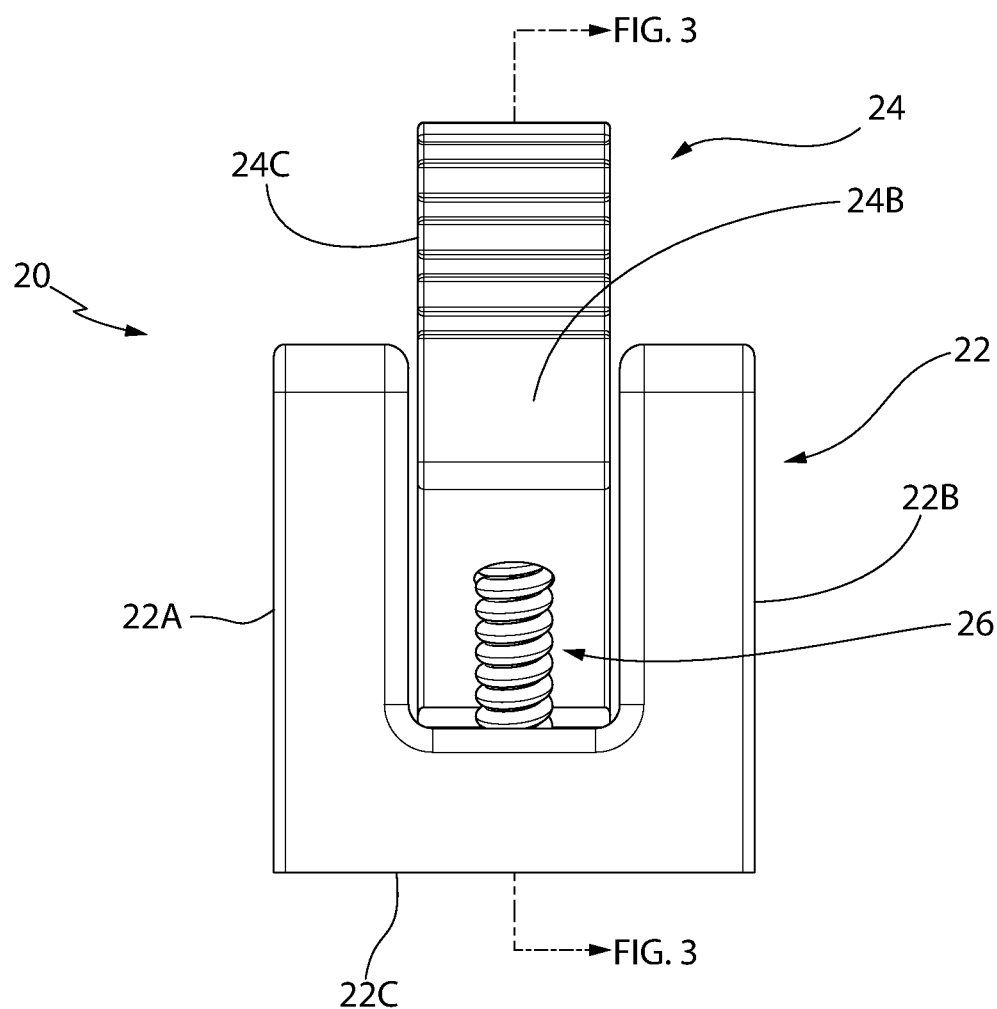
FIG. 2 is a front view of the self-activating stop device of U.S. Patent Publication No. 2020/0262329 (Scott, IV)
Figure 3:
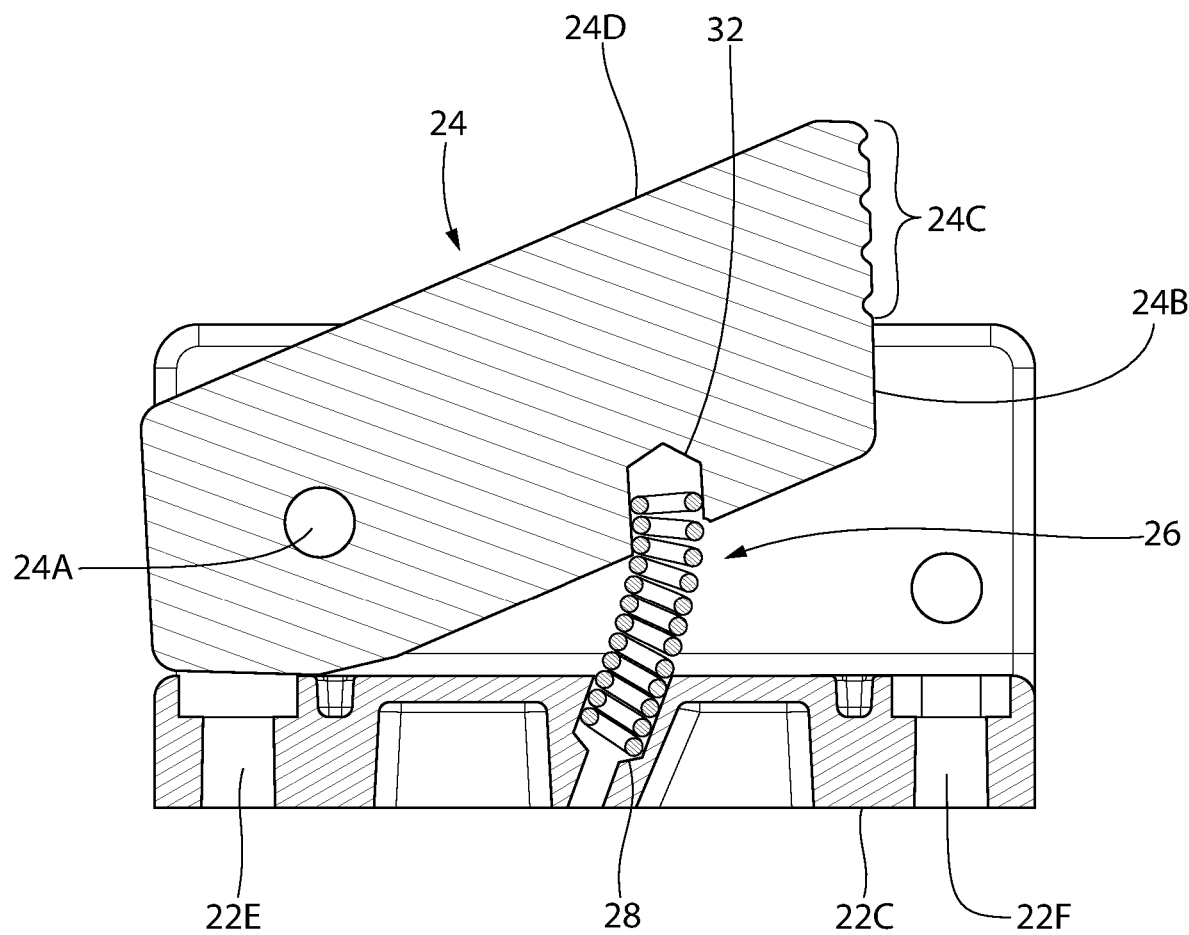
FIG. 3 is a cross-sectional view of the self-activating stop device taken along line 3-3 of FIG. 2.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

The invention of the present application is set forth in FIGS. 14-19B and its supporting text. Since the system and method of the present invention involve the use of a self-activating stop device as disclosed in U.S. Patent Publication No. 2020/0262329 (Scott, IV), which is ASN U.S. Ser. No. 16/865,876, Applicant has included the disclosure of that patent application herein with regard to FIGS. 1-13 and its supporting text. U.S. Patent Publication No. 2020/0262329 (Scott, IV) is incorporated by reference herein in its entirety and is owned by the same Assignee as the present application, namely, Boat Load Mate, Inc. of Naples, FL. As such, reference numbers used in FIGS. 1-13 are applicable to similar structure shown in FIGS. 14-19B (e.g., the U-shaped channel housing 22, the stop element 24, etc.)

Self-Activating Stop Device (SASD) 20

The self-activating stop device (SASD) 20 is shown most clearly in FIG. 1. The SASD 20 is designed for mounting on watercraft towing trailers to prevent the watercraft (e.g., a boat) from sliding back off the towing trailer during transfer (i.e., loading and launching) of the boat from the water, or from a storage location, etc. As will discussed in detail later, the SASD 20 is designed for use on a variety of watercraft towing trailers that can be generally divided into two categories: salt-watercraft towing trailers and fresh-watercraft towing trailers. The SASD 20 is mounted differently depending upon which type of towing trailer is to be used, as will be discussed later.

Figure 13:
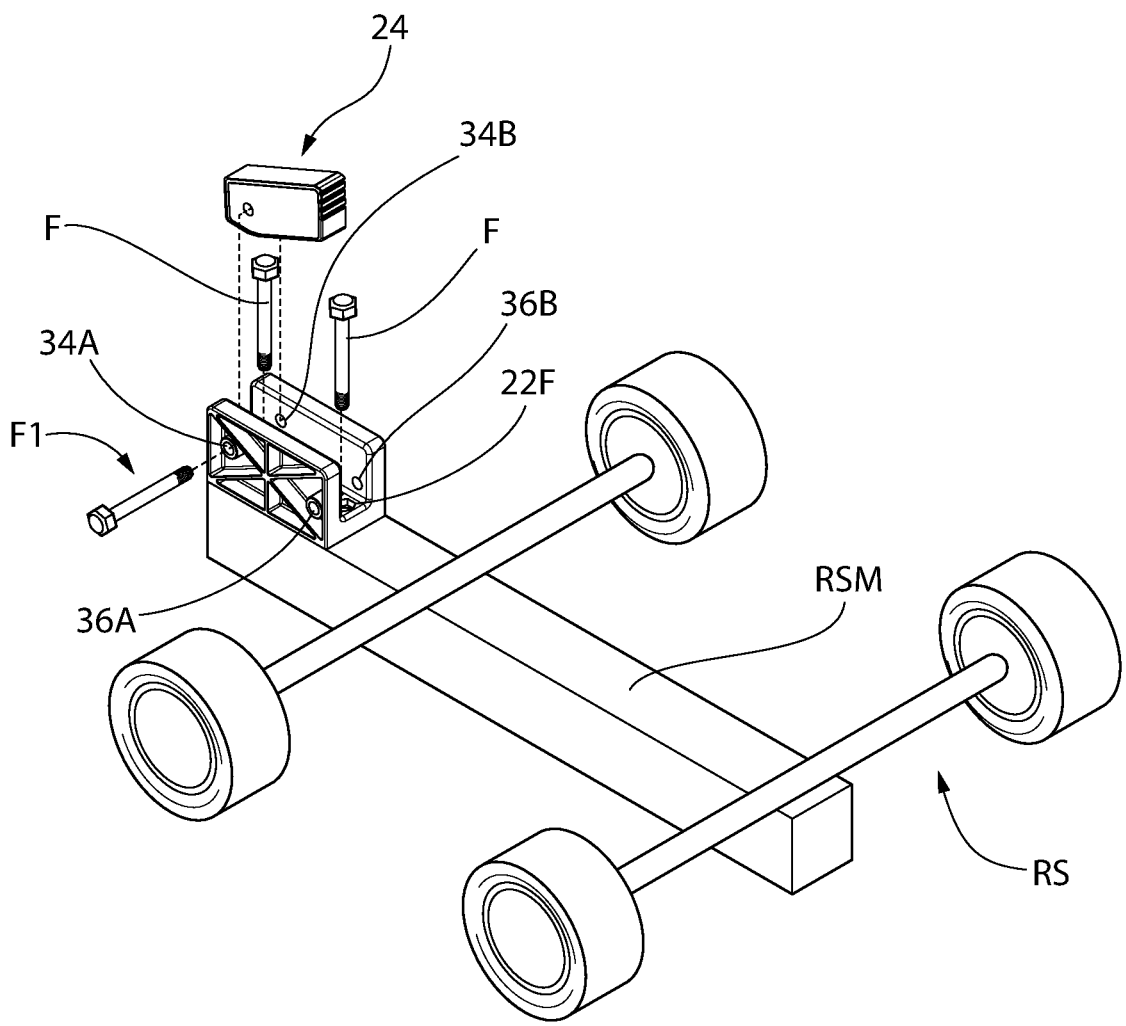
FIG. 13 is an exploded view of the self-activating stop device of U.S. Patent Publication No. 2020/0262329 (Scott, IV) as it is installed on the roller system of a fresh-watercraft towing trailer and wherein the spring is omitted for clarity.

As shown in FIG. 1, the SASD 20 comprises a U-shaped channel housing 22 into which a stop element 24 is pivotally-mounted. The U-shaped channel housing 22 comprises a pair of sidewalls 22A and 22B connected by a floor 22C. One end of a biasing means, e.g., a spring 26 (FIG. 3) is positioned in a nest 28 in the floor 22C of the U-shaped channel housing 22 while the other end of the spring 26 is positioned in a cavity 32 in the stop element 24. The stop element 24 pivots about an axle, e.g., a fastener F1 (e.g., a bolt, see FIG. 13) that is passed through a respective aperture 34A (aperture 34B is shown in FIG. 13) in the sidewalls 22A/22B when an aperture 24A in the stop element 24 is aligned with the sidewall apertures. In addition, another pair of apertures 36A and 36B in respective sidewalls 22A and 22B are provided for mounting the SASD 20, as will also be discussed later. As one can appreciate, the spring 26 urges the stop element 24 upward, causing the stop element 24 to pivot about the fastener F1 such that a ridged portion 24C of a stop surface 24C projects out of the U-shaped channel housing 22. In that state, known hereinafter as the "deployed mode", the SASD 20 acts a stop to a surface in contact with the ridged portion 24C. The ridges of the portion 24C act to make a more resistive contact with the watercraft, e.g., the transom portion of a boat. Conversely, when the weight of the watercraft is placed on the upper surface 24D of the stop element 24, the stop element 24 is forced downward, against the bias of the spring 26, into the channel 22D, forming a "retracted mode." The upper surface 24D of the stop element 24 is of a constant gradient and is angled upward with respect to the U-shaped channel housing 22 when the stop element 24 is in the deployed mode.

The SASD 20 comprises a lightweight, strong, compact and durable construction (e.g., marine-grade, nylon glass-filled polycarbonate, such as, but not limited to "Standard ULTREXR manufactured by the Spiratex Company of Romulus, Michigan) designed to resist the corrosive salt-sea/salt-air environment. By way of example only, the SASD 20 may comprise a weight of approximately 0.75 lbs and having dimensions, by way of example also, of approximately 5" (length)× 3" (width)× 2" (height).

Salt-Watercraft Towing Trailers Using The SASD 20

Figure 4:
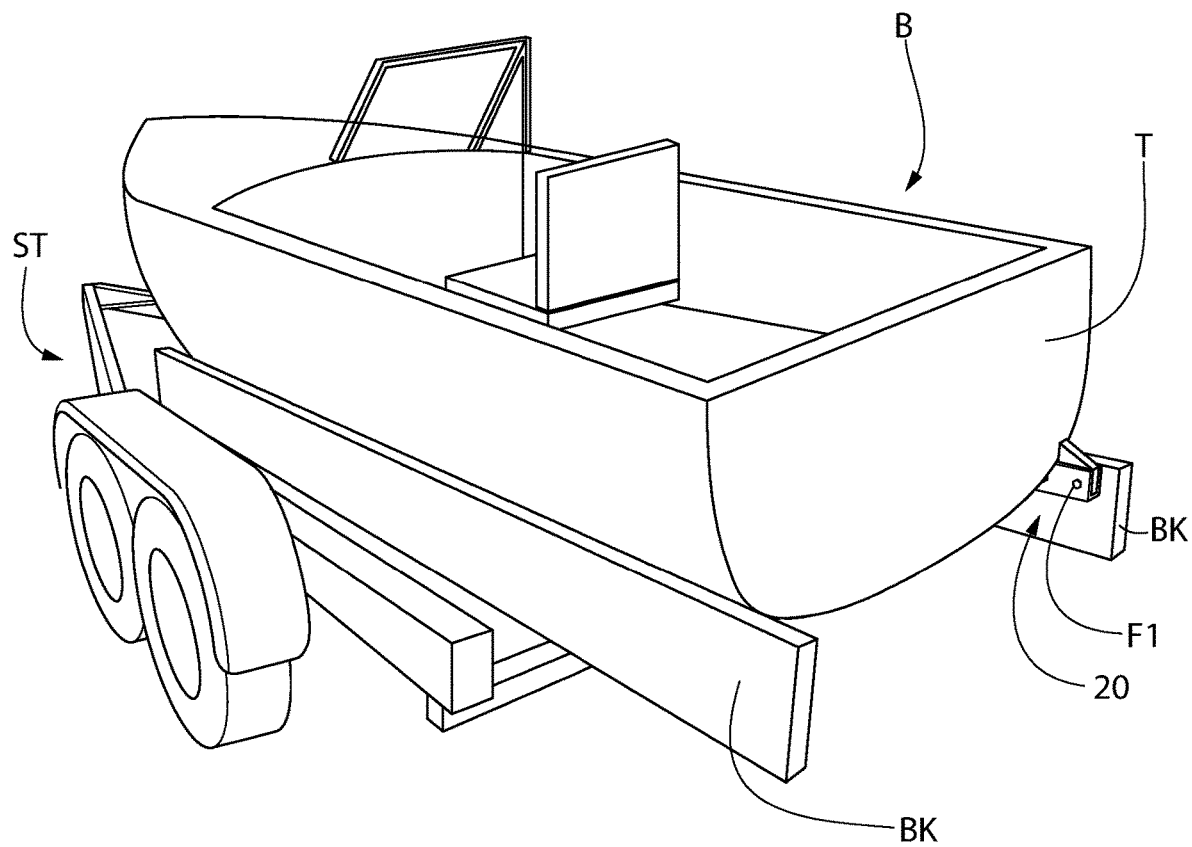
FIG. 4 is an isometric view of a boat deployed on a salt-watercraft towing trailer with the self-activating stop device of U.S. Patent Publication No. 2020/0262329 (Scott, IV) coupled thereto.
Figure 5:
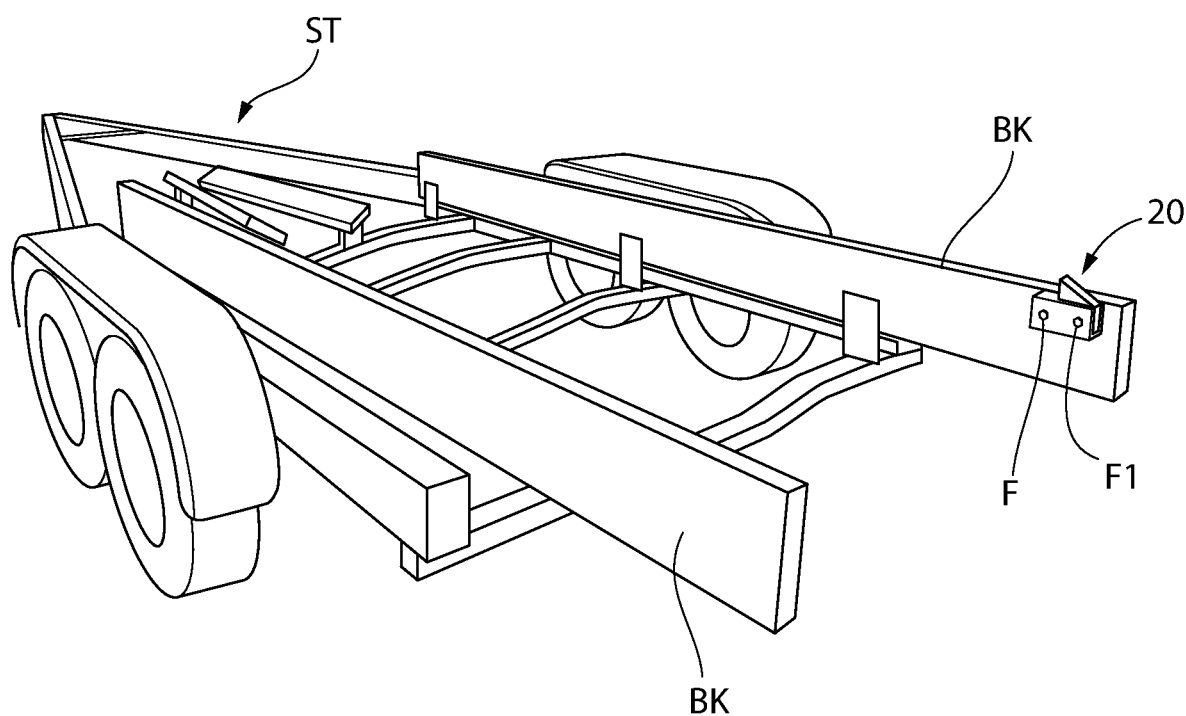
FIG. 5 is the same view as FIG. 4, but with the boat omitted to provide a clear view of the installation of the self-activating stop device of U.S. Patent Publication No. 2020/0262329 (Scott, IV)
Figure 6:
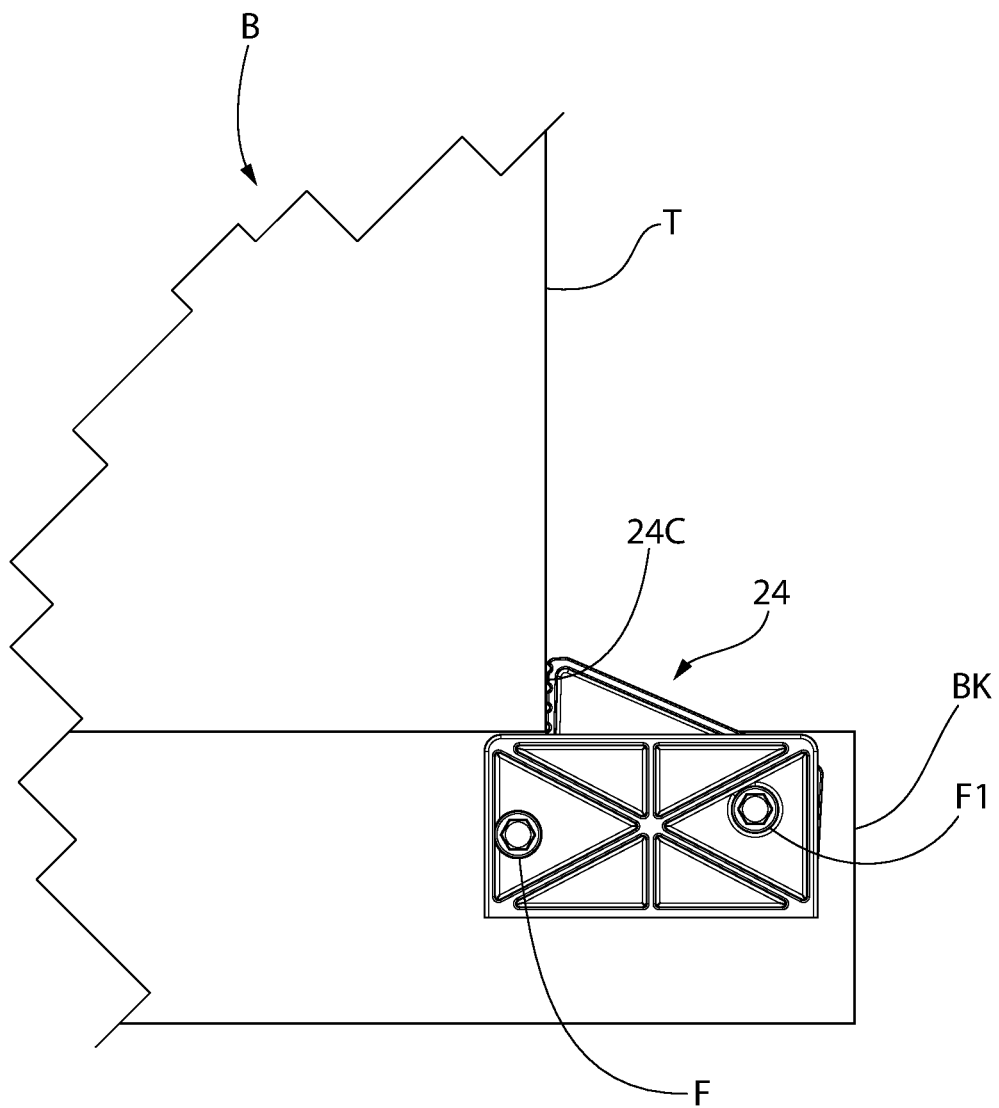
FIG. 6 is a partial view of the boat transom showing the self-activating stop device of U.S. Patent Publication No. 2020/0262329 (Scott, IV) in the deployed mode acting as a stop to prevent the boat from sliding off the trailer.
Figure 7:
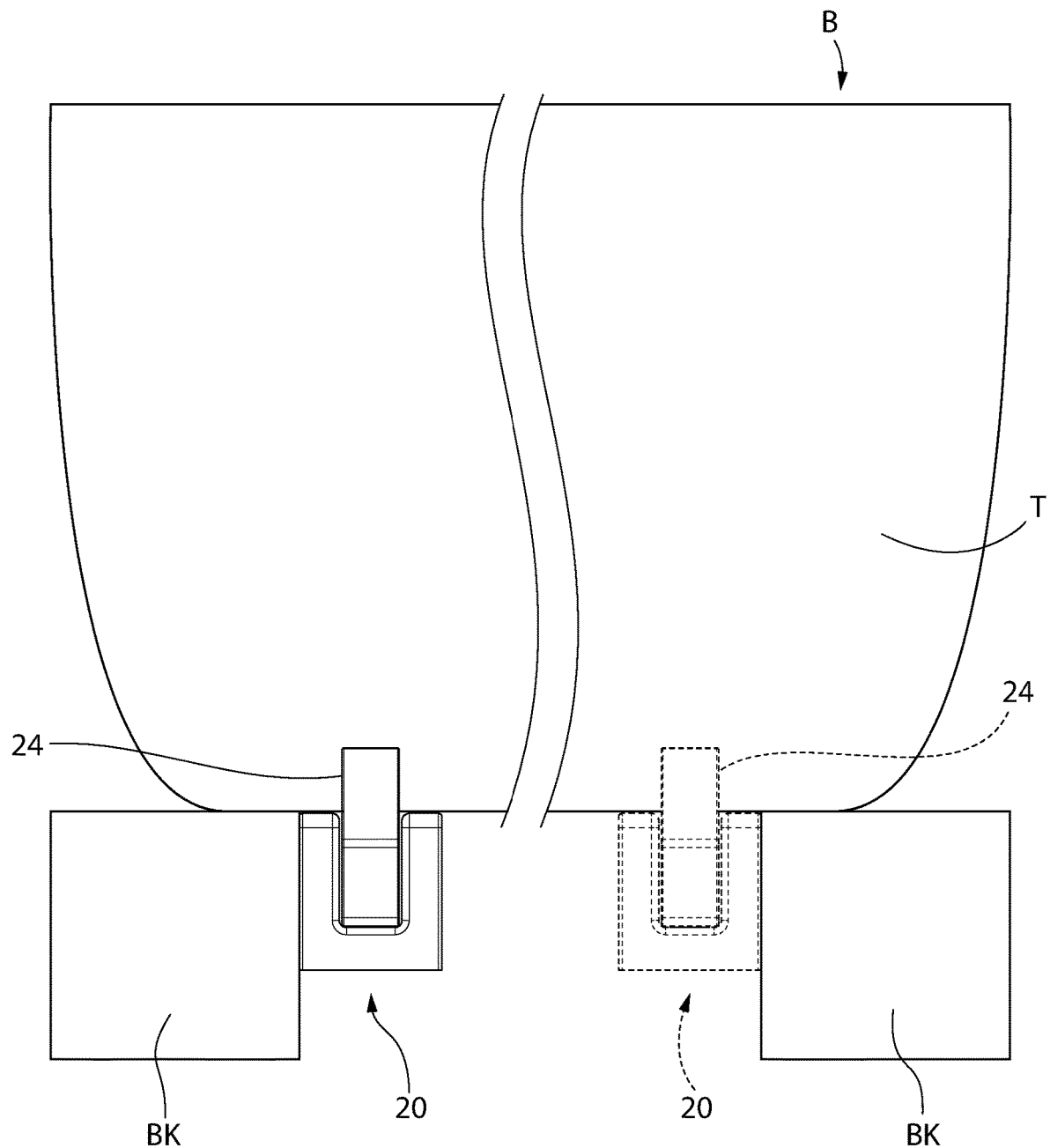
FIG. 7 is a rear view of the salt-watercraft towing trailer having the self-activating stop device of U.S. Patent Publication No. 2020/0262329 (Scott, IV) coupled thereto and shown in the deployed mode acting against the transom of the boat; a second self-activating stop device is shown in phantom.
Figure 8:
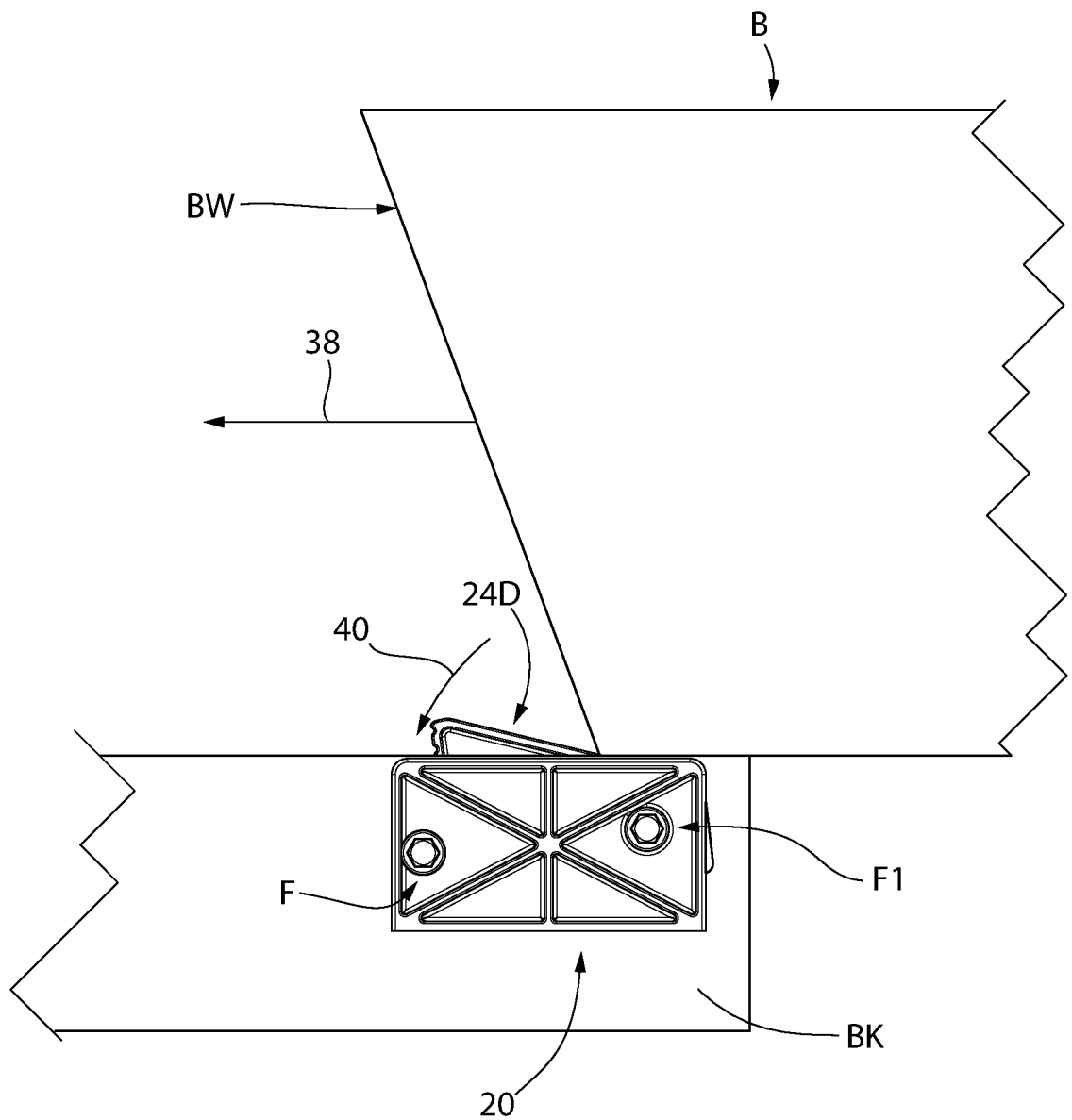
FIG. 8 is a partial view of the bow of the boat initially making contact with the self-activating stop device of U.S. Patent Publication No. 2020/0262329 (Scott, IV) and causing the self-activating stop device to move into its retracted mode.

Trailers that are commonly used for the transportation of and launching/loading of watercraft in sea/salt water typically utilize "bunks" to support the weight of the watercraft when the trailer is out of the water, and make it easy to launch or load the watercraft when the trailer is in the water. The term "bunks" as used throughout this Specification is directed to elements (typically comprising wood) that run along the sides of the trailer and upon which the watercraft (typically a boat) is positioned when it is loaded onto the trailer. As such, these bunks support the weight of the watercraft when the watercraft is loaded onto, or removed from, the trailer. An example of such bunks is shown in FIGS. 4-5. Because of the corrosive nature of salt water environments, bunks are typically comprised of wood which is well-known to withstand such environments.

FIG. 5 depicts an exemplary salt/sea watercraft towing trailer ST having a pair of bunks BK secured on each side of the trailer ST. The SASD 20 is then secured to one of the bunks BK at the rear of trailer ST. Because the bunk BK is typically comprised of wood, the SASD 20 can be quickly and easily mounted to the side of the bunk BK. In particular, to mount the SASD 20 to one of the bunks BK, the user aligns the top surface of the sidewall (22A or 22B) of the housing 22 that is in contact with the bunk BK. A marker (e.g., pen or pencil, etc.) is passed through the aligned apertures 34A/34B and 36A/36B to mark points on the bunk BK for forming respective holes therein (e.g., drilled). The SASD 20 is then attached as follows: the spring 26 and stop element 24 are assembled in the housing 22 and the fastener F1 is passed through the apertures 34A/34B and stop element aperture 24A and into the corresponding hole (not shown) in the bunk BK and then tightened therein. Another fastener F is passed through the apertures 36A/36B and into another corresponding hole (not shown) in the bunk BK and then tightened therein. As such, the SASD 20 is secured to the bunk, in the deployed mode, as shown in FIG. 5. One can appreciate that the fastener F1 has a dual use: not only does it form the axle about which the stop element 24 pivots but it is also used to secure the SASD 20 against the bunk BK.

The SASD 20 is now ready for use. As shown most clearly in FIG. 8, when the bow BW of the watercraft (e.g., boat B) is lifted onto the two bunks BK at the rear of the trailer ST and moved forward (see arrow 38), the bow BW contacts the upper surface 24D of the stop element 24 and drives the stop element 24 downward (see arrow 40) into the channel 22D in the housing 22, i.e., the retracted mode. As the boat B continues to move forward while its weight is supported on the bunks BK, once the transom T (FIG. 6) of the boat B passes over the stop element 24, the spring 26 is free to displace the stop element 24 upward. As such, the ridged portion 24C of the stop element 24 acts as a stop to prevent the boat B from sliding back off the trailer ST, as shown most clearly in FIG. 4. Because of the presence of this stop element 24, this permits other mechanisms that secure the boat during transport to be removed prior to launching the boat in the boat slip area.

Figure 9:
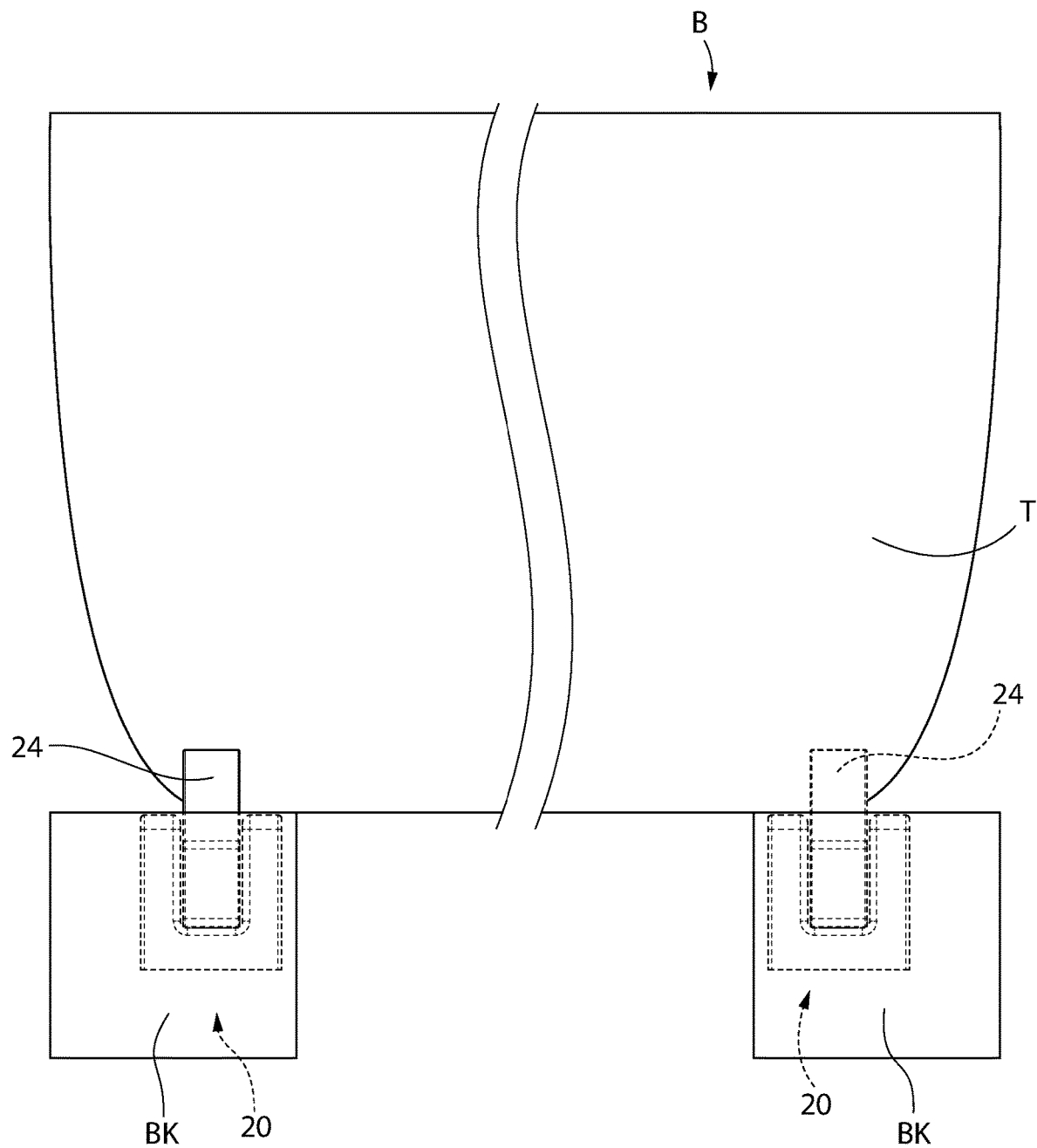
FIG. 9 is a rear view of a salt-water towing trailer having the self-activating stop device of U.S. Patent Publication No. 2020/0262329 (Scott, IV) integrated into the towing trailer rather than being an add-on; a second integrated self-activating stop device is shown in phantom.

Although only one SASD 20 is required to secure the watercraft on the trailer ST, it should be noted that a second SASD 20 (shown in phantom in FIG. 7) can also be secured to the other bunk BK for added security. The SASD 20 may be integrated within the bunk BK by the trailer ST manufacturer, as shown in FIG. 9. Thus, rather than being an "add-on", the SASD 20 can be an integrated feature of the trailer ST when manufactured.

Fresh Watercraft Towing Trailers Using The SASD 20

Figure 11:
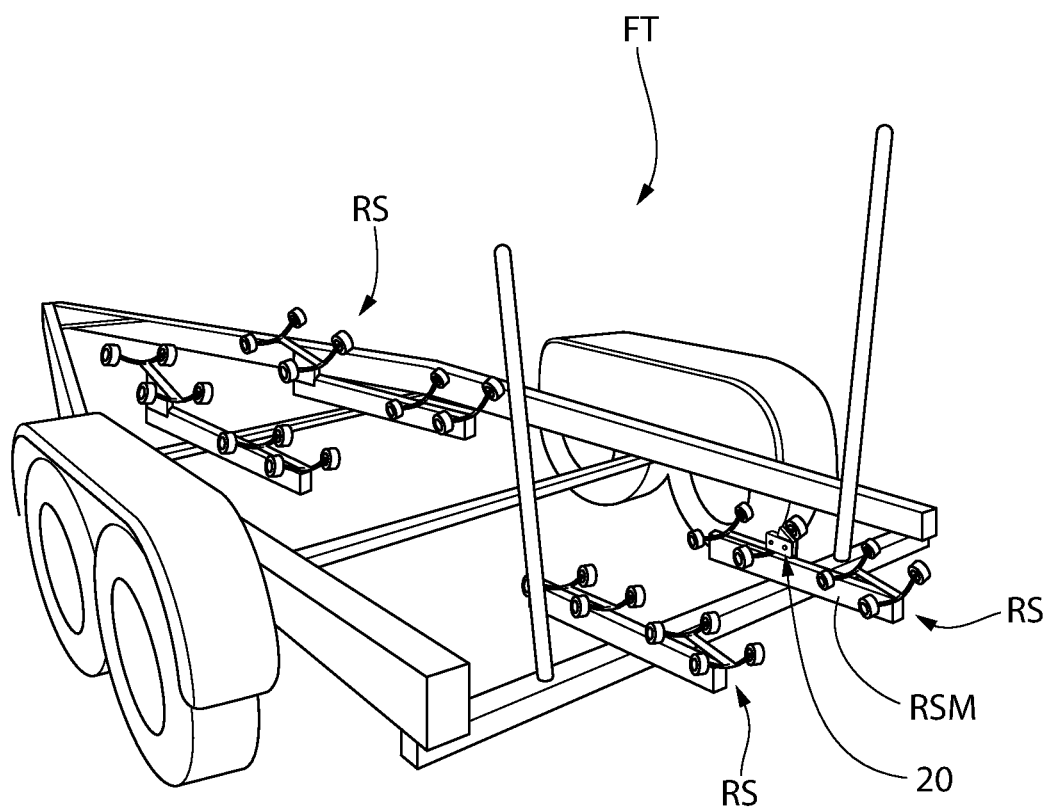
FIG. 11 is the same view as FIG. 10, but with the boat omitted to provide a clear view of the installation of the self-activating stop device of U.S. Patent Publication No. 2020/0262329 (Scott, IV)

Trailers used for towing fresh watercraft are not exposed to the corrosive salt water environment and therefore these types of trailers FT typically utilize roller systems RS for carrying the weight of the watercraft thereon (see FIG. 11). As such, there are no "wooden bunks" used on these types of trailers. To secure the SASD 20 on these freshwater towing trailers FT, the SASD 20 is typically secured to the trailer FT along the U-shaped channel housing floor 22C. To accommodate this different securing method, the floor 22C comprises a pair of countersunk apertures 22E/22F, as shown most clearly in FIG. 3. The countersunk portions of these apertures may comprise a "hex" shape (see FIG. 1 regarding countersunk aperture 22F) to lock the head of the fastener F (e.g., a bolt) therein.

Figure 12:
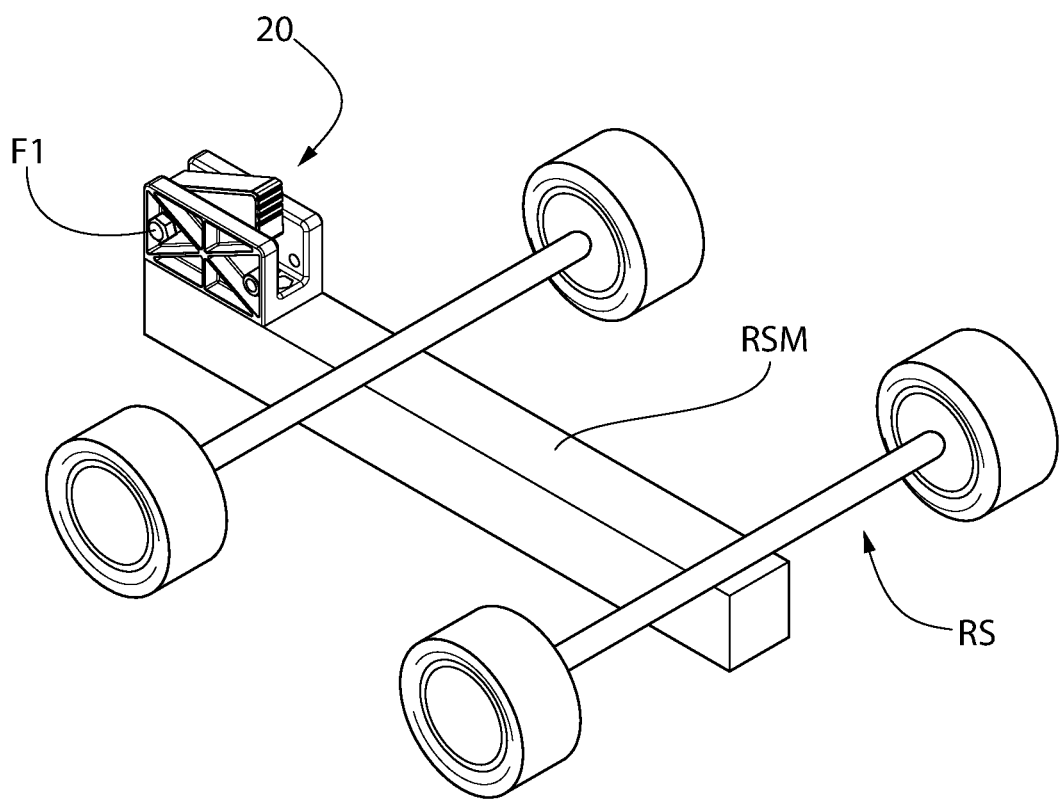
FIG. 12 is a diagrammatic view showing the installation of the self-activating stop device of U.S. Patent Publication No. 2020/0262329 (Scott, IV) installed on a roller system of a fresh-watercraft towing trailer.

In particular, for ease of clarity, the attachment method for securing the SASD 20 to the freshwater trailer FT is shown in FIGS. 12-13. In particular, before the stop element 24/spring 26 are assembled in the U-shaped channel housing 22, the housing 22 itself is secured to one of the roller system mounts RSM. Fasteners F are passed through the countersunk apertures 22E/22F in the floor 22C and into the mount RSM plate. Once these fasteners are secured therein, the stop element 24 and spring 26 are assembled in the channel 22D. Since the SASD 20 is not being side-mounted as discussed previously with the salt/sea water trailer ST, the fastener F1 is then passed through the apertures 34A/34B and the stop element aperture 24A and secured on the other side of the housing 22 with a fastener tie-off, e.g., a lock nut (not shown), resulting in attachment of the SASD 20 to the roller system mount RSM, as shown in FIG. 12.

Figure 10:
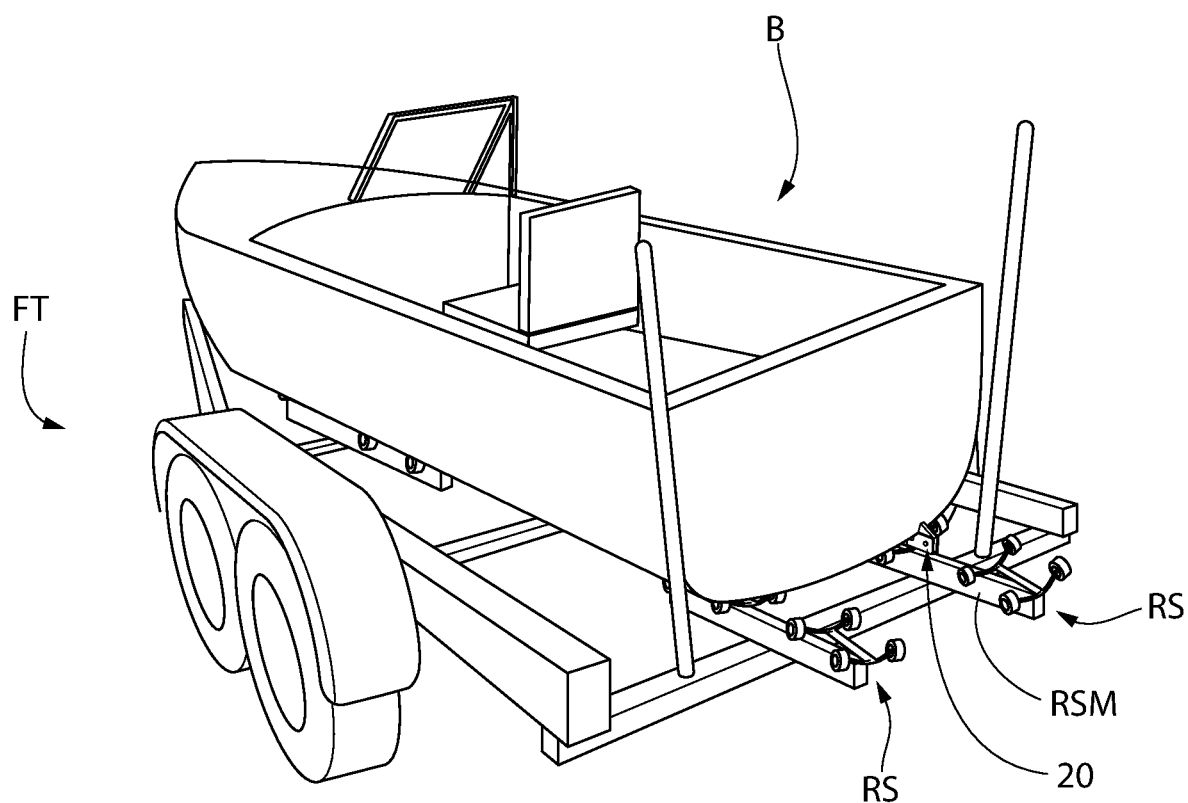
FIG. 10 is an isometric view of a boat deployed on a fresh-watercraft towing trailer with the self-activating stop device of U.S. Patent Publication No. 2020/0262329 (Scott, IV) coupled thereto.

With the SASD 20 secured to the roller system mount RSM, the freshwater trailer FT is ready to receive the watercraft (e.g., boat B) thereon, as shown in FIG. 11. The SASD 20 operates in the same manner as described previously with regard to receiving the boat B on the salt/sea water trailer ST such that once the transom T of the boat B passes over the SASD 20 while riding on the roller system RS, the stop element 24 is positioned in the deployed mode, acting as stop against the boat transom T, as shown in FIG. 10.

As with the integrated design of the SASD 20 with the salt/sea watercraft trailer ST, The SASD 20 may also be integrated into the roller systems RS by the FT trailer manufacturer. Thus, rather than being an "add-on", the SASD 20 can be an integrated feature of the trailer FT when manufactured.

Conversely, when it comes time to launch/release the watercraft (e.g., boat B) from the trailer ST/FT, the trailer ST or FT with the watercraft B thereon is backed down into the water and while the trailer ST or FT is submerged therein, the watercraft B floats on the water, thereby clearing itself of the SASD 20 and the trailer ST or FT. The operator of the watercraft B can then steer it away in the body of water. The trailer ST or FT is then driven out of the body of water.

The fasteners F/F1 used in the SASD 20 may comprise, by way of example only, ⅜" bolts.

In view of the foregoing, it should be understood that the SASD 20:
 (1) is not a guidance tool. The SASD 20 does not guide the watercraft on and off the trailers ST/FT; rather the bunks BK and roller systems RS do that.
 (2) does not carry the load of the watercraft (e.g., boat B); rather the bunks BK or the roller systems RS of the trailers ST and FT, respectively, do that.
 (3) comprises apertures 34A/34B and 22E/22F that provide a "universal mounting" capability for the SASD 20.

Self-Activating Stop Device Providing an Indication Using Wireless Communication In view of the foregoing, Applicant has improved the SASD 20 by implementing a system 100 (FIGS. 16-17) of providing an indication to the boat driver of the status of the boat on the trailer (ST or FT).

The system 100 comprises a self-activating stop device with transmitter (SASDT) 120 (FIG. 14) coupled to the trailer (ST or FT), as discussed previously, and a receiver 121 (FIG. 15) that is positioned on or near the console of the boat where the driver of the boat is located. As with the SASD 20, the SASDT 120 is designed for mounting on watercraft towing trailers to prevent the watercraft (e.g., a boat) from sliding back off the towing trailer during transfer (i.e., loading and launching) of the boat from the water, or from a storage location, etc. The SASDT 120 is designed for use on a variety of watercraft towing trailers that can be generally divided into two categories: salt-watercraft towing trailers and fresh-watercraft towing trailers. The SASDT 120 is mounted differently depending upon which type of towing trailer is to be used, as discussed above with regard to the SASD 20. Furthermore, the SASDT 120 includes a transmitter-detector assembly TC (FIG. 18B) for detecting the "retracted mode" of the stop element (as will be discussed later) and transmitting a signal SIG to a remotely-located receiver 121 and indicator 121A, preferably located on the dashboard of the boat B to be loaded onto the trailer ST or FT. Although not shown, the receiver 121 may be releasably secured to the console or dashboard of the boat using a variety of securement means (hook and pile, fasteners, clips, magnets, etc.).

Figure 16:
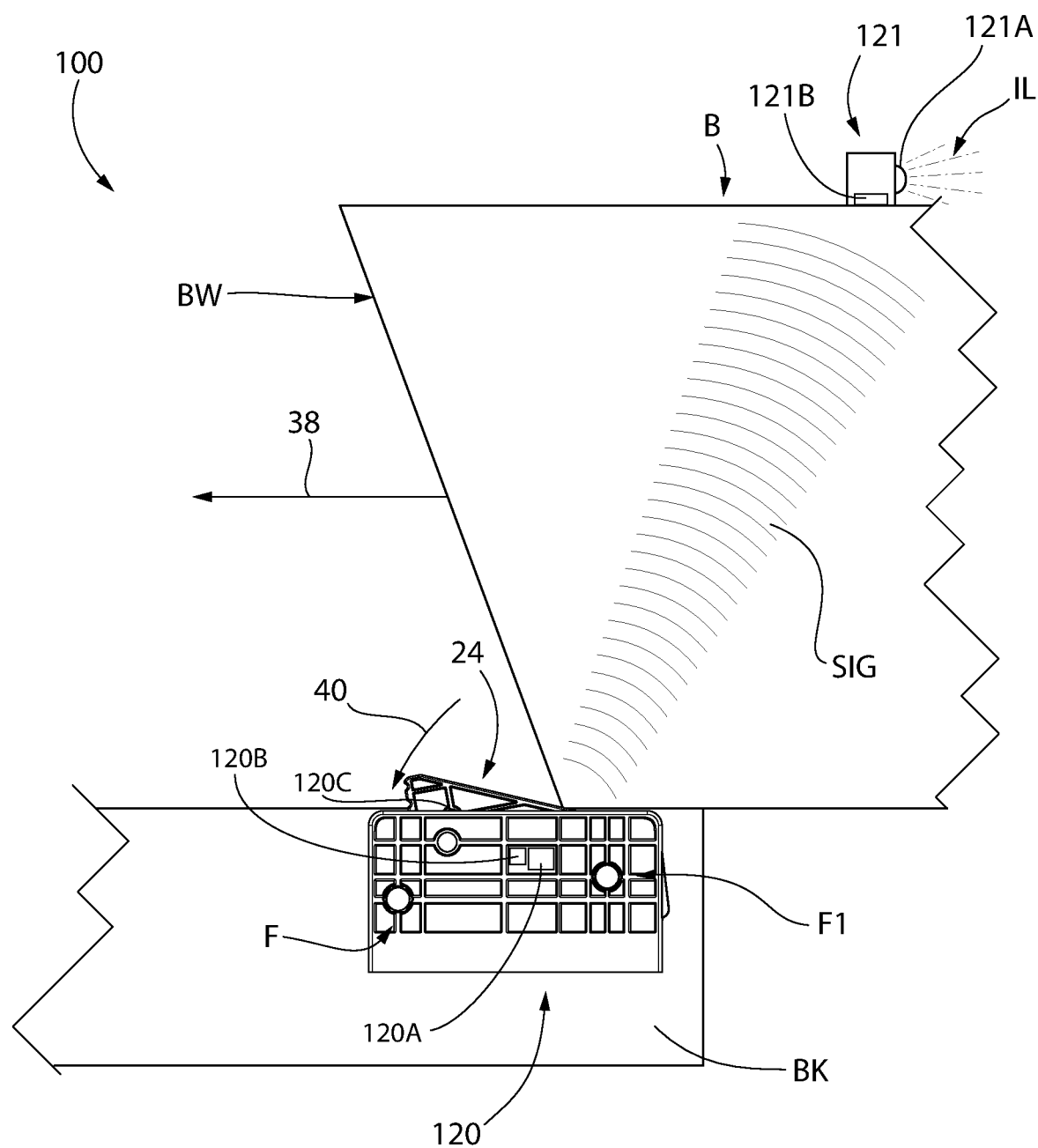
FIG. 16 is a partial view of the trailer and boat showing the system of the present invention whereby the transmitter of the self-activating stop device is on, communicating with the receiver, since the self-activating stop device is in its retracted mode.
Figure 17:
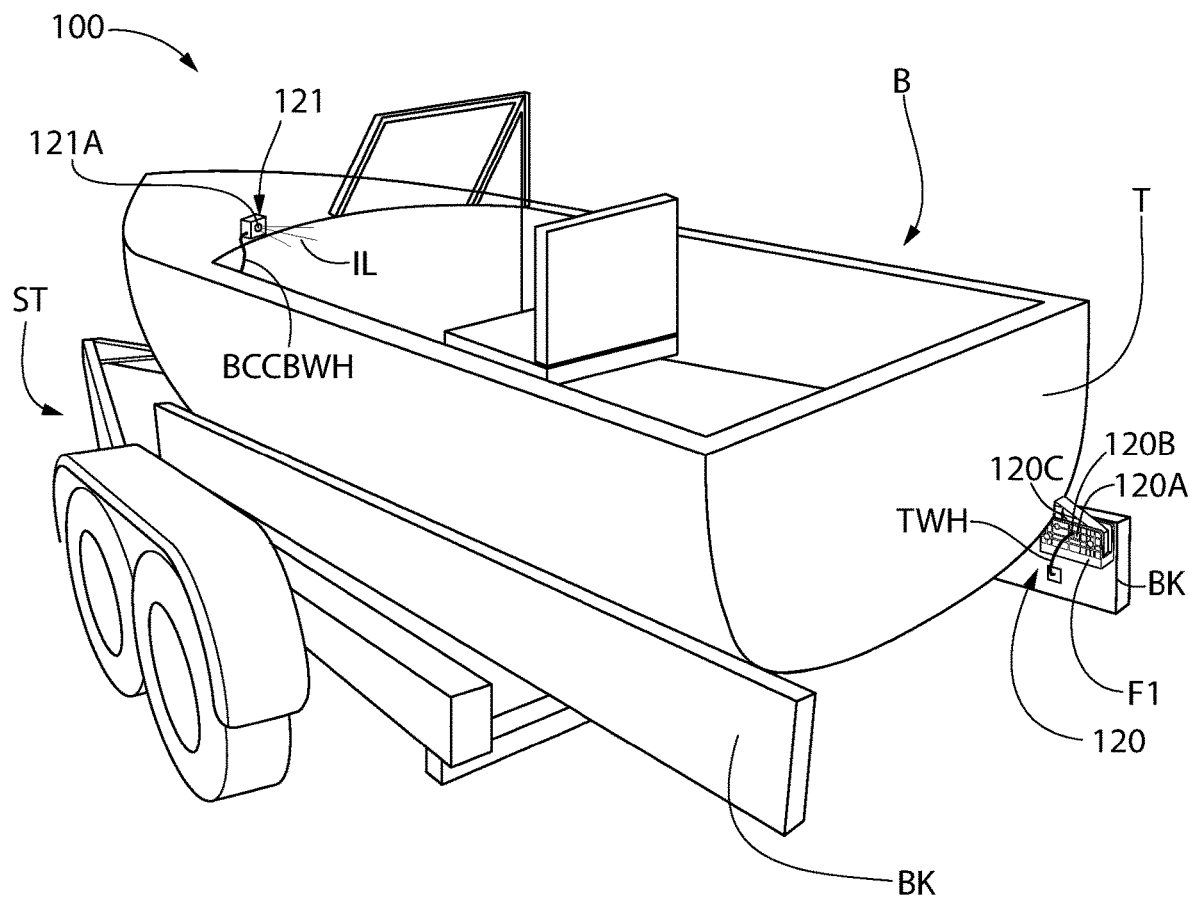
FIG. 17 is an isometric view of the system of FIG. 16 showing exemplary installation positions of the self-activating stop device and receiver of the present invention.
Figure 18A:
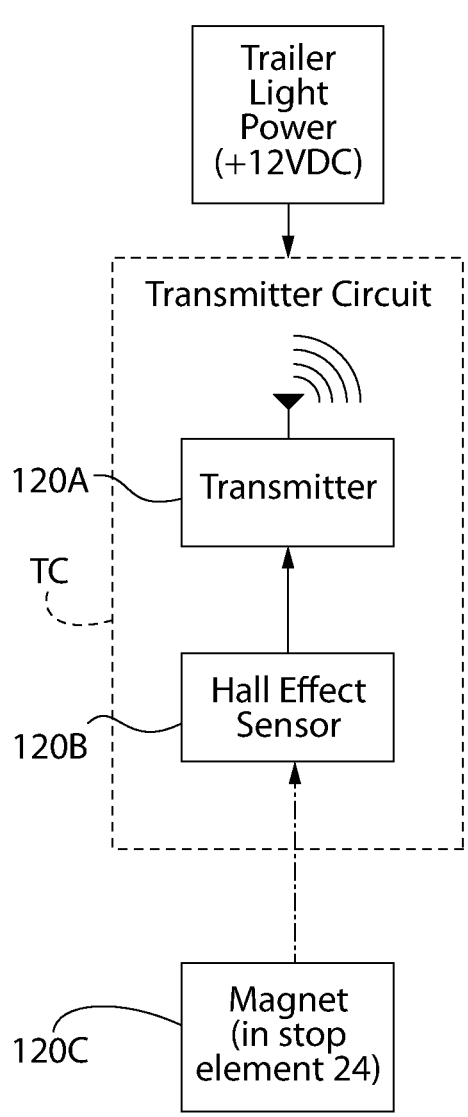
FIG. 18A is a block diagram of the transmitter circuit of the self-activating stop device.
Figure 18B:
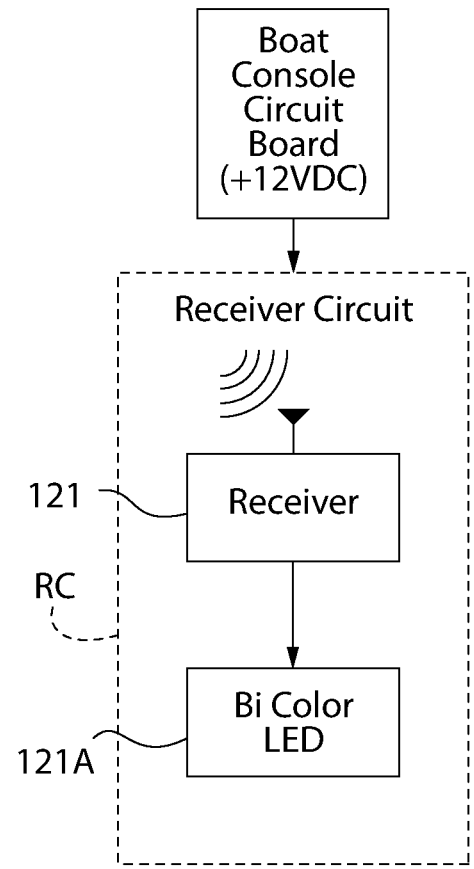
FIG. 18B is a block diagram of the receiver circuit of the receiver.
Figure 19A:
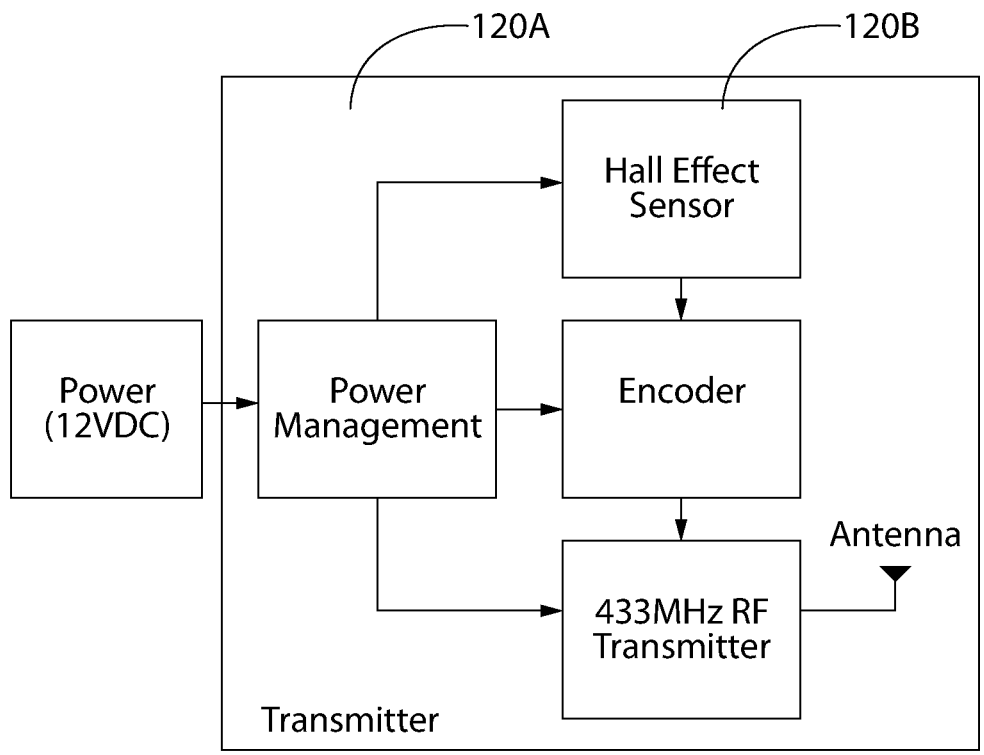
FIG. 19A is a block diagram of the transmitter itself.
Figure 19B:
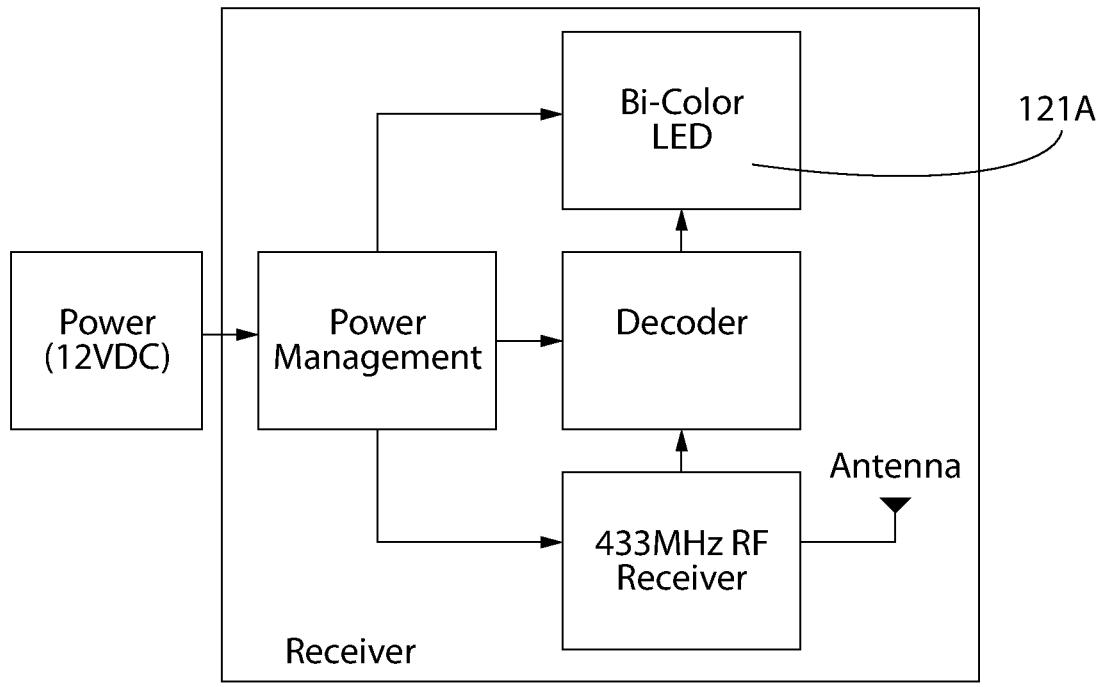
FIG. 19B is a block diagram of the receiver itself.

The stop element 24 of the SASDT 120 further comprises a target element 120C (e.g., magnet (e.g., a neodymium magnet, etc.), or any ferromagnetic material, etc.) that can be detected by a detector assembly 120B (e.g., a non-contact sensor such as a proximity sensor, a Semtech SX9210 smart proximity sensor, Hall Effect Sensor, Silicon Labs SI7201-B-86-IV, etc., see FIGS. 18A/19A; as such, the Hall Effect Sensor is shown by way of example only and the detector assembly is not limited to that particular detection mechanism). As shown most clearly in FIG. 16, when the target element 120C is moved towards/into the U-shaped channel housing 22, the detector assembly 120B detects the presence of the target element 120C and which turns on the transmitter 120A which encodes that information (corresponding to stop element 24 "down"-being the retracted mode, using the encoder (e.g., Encoder/Decoder IC Data-Logging, Data Exchange 8-SOIC, shown in FIG. 19A) into the signal SIG transmitted to the receiver 121 (FIG. 16). The transmitter 120A (e.g., RF transmitter ASK, OOK 433 MHz-4 dBm~4 dBm 10 kbps Castellation Antenna 8-SMD module-AZ1117IH-3.3TRG1), emits a wireless signal SIG in the ISM band (e.g., 300-400 MHZ, 902 MHZ, 2.5 GHZ, 5.725 GHZ, etc.) as long as the detector 120B continues to detect the target element 120C.

When the receiver 121 is not detecting any incoming signal SIG, the receiver electronics activates one LED of a bi-color LED (e.g., bi-color panel mount LED-Dialight 6061415120F, etc.), namely, a green color, so that the indicator 121A emits a green color IL. This green color informs the boat driver that the stop element 24 is in the deployed mode. However, when the stop element 24 is driven downward into U-shaped channel housing 22, i.e., in the retracted mode (i.e., the bottom of the boat is passing over the stop element 24-see FIG. 16), the transmitter 120A is turned on, the encoder encodes the retracted mode status in the signal SIG which is transmitted to the receiver 121. Upon receipt of the signal SIG, the receiver electronics decoder (e.g., Encoder/Decoder IC Data-Logging, Data Exchange 8-SOIC) decodes the signal SIG and immediately shuts off the green color LED and immediately energizes the other one of the LEDs of the bi-color LED, namely, a red color so that the indicator 121A emits a red color IL (FIG. 16). This switching from the first color to the second color, or vice versa, is also referred to as "toggling" the bi-color LED. And as long as the stop element 24 remains in the retracted mode, the indicator 121A continues to emit the red color, warning the boat driver that the boat B is not yet secured on the trailer ST or FT. However, once the transom T of the boat B clears the stop element 24 (FIGS. 6 and 16), the stop element 24 immediately moves to the deployed mode (i.e., out of U-shaped channel housing 22), wherein the detector 120B no longer detects the target element 120C and which turns off the transmitter 120A. Once the transmitter 120A turns off, the signal SIG is no longer transmitted and thus the receiver 121 is no longer receiving the signal SIG. As such, the receiver electronics immediately shut off the red color LED of the bi-color LED and immediately turns on the green color LED of the bi-color LED. This assures the boat driver that the stop element 24 is in the deployed mode, securing the boat on the trailer ST or FT.

As shown in FIG. 18A, power to the transmitter circuit TC may be provided from the trailer ST or FT power. In particular, trailer power may be provided to the transmitter circuit TC using a trailer wire harness TWH (FIG. 17) that connects to power leads (not shown) available at the transmitter 120A. Similarly, power to the receiver circuit RC may be provided from the boat console circuit board (BCCBWH) via a wire harness (FIG. 17) which connects to a connector 121B (FIG. 15) on the receiver 121. The power management module in the transmitter 120A and receiver 121 may comprise a Linear Voltage Regulator IC Positive Fixed Output 1A SOT-223-3 (AZ1117IH-3.3TRG1).

It should be noted that use of the bi-color LED is by way of example only and that other visual indicia are within the broadest scope of the invention. As such, one type of indicia is color, with a red color indicating the unsecured status of the boat on the trailer ST or FT and with a green color indicating the secured status of the boat on the trailer ST or FT. Alternatively, other indicia may be a written message UNSECURED or SECURED on an LCD display. Thus, the present invention is not limited to color as the visual indicia.

It should be noted that at the time of manufacturing, each transmitter and receiver pair are synchronized so as to not cause any electromagnetic interference with other transmitter/receiver pairs.

It should be further noted that an alternative to the transmitter circuit TC and the receiver circuit RC may each include a microcontroller (e.g., AVR tinyAVRTM 1 Microcontroller IC 8-bit 20 MHz 8 KB (8K×8) FLASH 20-QFN (3×3)) for controlling the non-contact sensor 120B (e.g., Hall Effect Sensor) and the encoder in the transmitter 120A and for controlling the decoder and the bi-color LED in the receiver 121. In addition, an alternative transmitter/receiver pair that can be used in the present invention are respective transmitter and receiver modules, Linx TXM-433-LR and Linx RXM-433-LR.

The transmitter 120A and detector 120B may be coupled to the housing 22 using an epoxy, preferably a water-resistant epoxy (e.g., translucent epoxy encapsulating and potting compound from MG Chemicals 832C-375ML). Waterproofing these components permits proper transmitter 120A/120B operation when the SASDT 120 is submerged and wet during the retrieval of the boat B retrieval from the water.

It should be understood that the SASDT 120 of the present invention can be used in any manner, setting or environment as the SASD 20 disclosed in FIGS. 4-13.

It is also within the broadest scope of the present invention to include batteries within the SASDT 120 and the receiver 121 for providing electrical power as alternatives to the trailer power and the boat console board power.

Figure 14:
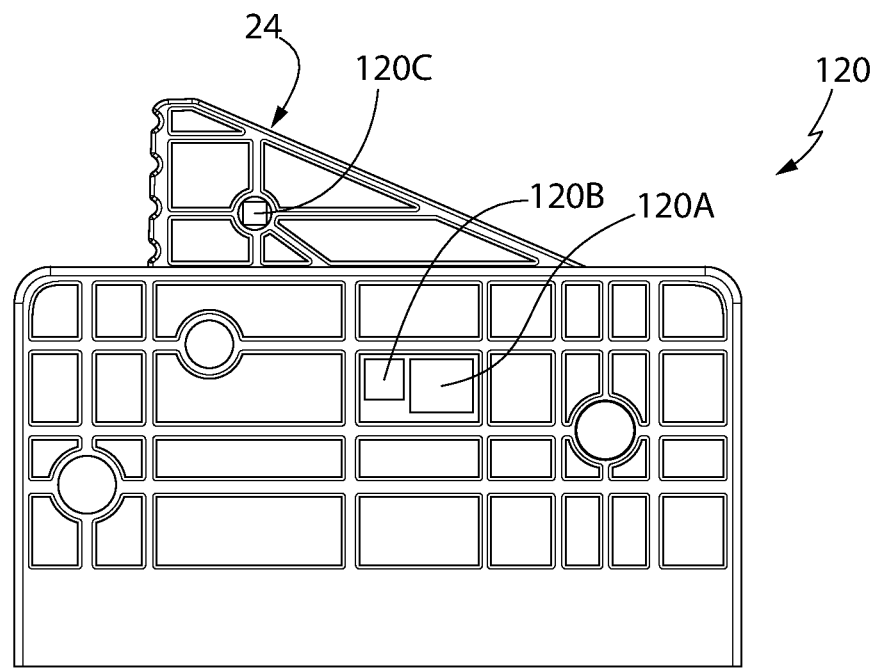
FIG. 14 is a side view of the self-activating stop device of the present invention which includes a transmitter and is shown in its deployed mode with the transmitter off.
Figure 15:
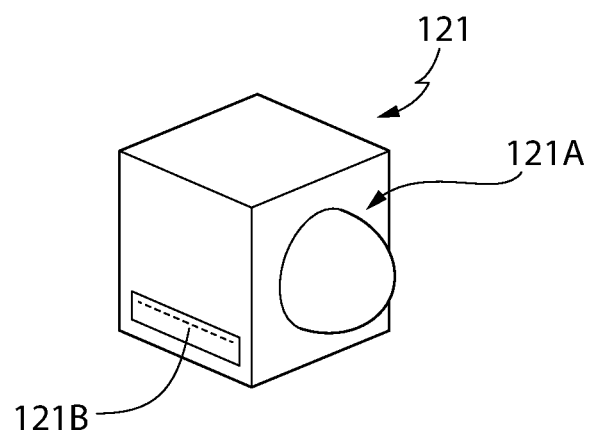
FIG. 15 is an isometric view of a receiver that communicates with the transmitter of the self-activating stop device of FIG. 14.

It should also be understood that the location of the target element 120C shown in FIG. 14 is by way of example only and that the actual location of the target element 120C may be, for example, at a lower elevation and/or at a more central location, on/in the stop element 24. The important feature is that the target element 120C is on or in the stop element 24 so that the detector 120B is able to detect the target element 120C as the stop element 24 moves from the deployed mode to the retracted mode, to warn the boat driver that the stop element 24 is not in the deployed mode.

While the invention has been described in detail and with reference to specific examples thereof, it will be apparent to one skilled in the art that various changes and modifications can be made therein without departing from the spirit and scope thereof.

What is claimed is:

1. A system for providing a self-activating stop apparatus on a watercraft trailer that automatically alerts a driver of the watercraft of the status of the watercraft being moved onto the trailer from a body of water, said system comprising:
    a self-activating stop apparatus comprising:
        a stop element pivotally mounted in a housing, configured for mounting to the trailer, and biased into a deployed mode such that a portion of said stop element protrudes out of said housing and wherein said portion of said pivotal stop element is driven into a retracted mode whenever the watercraft is being driven over said pivotal stop element, said pivotal stop element being restored into said deployed mode once one end of said watercraft has passed over said pivotal stop element, thereby acting as a stop for preventing the watercraft from sliding off said trailer;
        a detector and a transmitter, said detector configured to detect said retracted mode of said pivotal stop element and to activate a transmitter to emit a wireless signal while said detector detects said retracted mode of said pivotal stop element;
    a receiver positioned on the watercraft for receiving said wireless signal; and
    an indicator, associated with said receiver, said indicator illuminating a first indicia whenever said receiver is receiving said wireless signal, thereby alerting the driver that the watercraft is unsecured on the trailer.

2. The system of claim 1 wherein said detector comprises a non-contact sensor.

3. The system of claim 2 wherein said non-contact sensor is a Hall effect sensor and a target member, for detection by said Hall effect sensor sensor, is a ferromagnetic element positioned in said pivotal stop element.

4. The system of claim 1 wherein said indicator illuminates a second indicia, different from said first indicia, whenever said receiver is not receiving said wireless signal.

5. The system of claim 4 wherein said first indicia is a red color and said second indicia is a green color.

6. A method for implementing a self-activating stop apparatus on a watercraft trailer that automatically alerts a driver of the watercraft of the status of the watercraft being moved onto the trailer from a body of water, said method comprising:
    positioning a self-activating stop apparatus on the trailer whereby a pivotal stop element is biased into a deployed mode and wherein said pivotal stop element is driven into a retracted mode whenever the watercraft is being driven over said pivotal stop element, said pivotal stop element being restored into said deployed mode once one end of the watercraft has passed over said pivotal stop element, thereby acting as a stop for preventing the watercraft from sliding off said trailer;
    providing a detector for detecting said pivotal stop element in said retracted mode;
    activating a transmitter, by said detector when said retracted mode is detected, to transmit a wireless signal as long as said detector is detecting said pivotal stop element in said retracted mode;
    providing a receiver on the watercraft for receiving said wireless signal;

associating an indicator with said receiver in the watercraft; and illuminating said indicator with a first indicia as long as said receiver is receiving said wireless signal, thereby indicating that said pivotal stop member is in said retracted mode and the watercraft is unsecured on the trailer.

7. The method of claim 6 wherein said detector comprises a non-contact sensor.

8. The method of claim 7 wherein said non-contact sensor is a Hall effect sensor and a target member, for detection by said Hall effect sensor is a ferromagnetic element positioned in said pivotal stop element.

9. The method of claim 6 wherein said indicator illuminates a second indicia, different from said first indicia, whenever said receiver is not receiving said wireless signal.

10. The method of claim 9 wherein said first indicia is a red color and said second indicia is a green color.

\* \* \* \* \*